(12) United States Patent
Park

(10) Patent No.: US 9,168,830 B2
(45) Date of Patent: Oct. 27, 2015

(54) PLASTIC FUEL TANK COMPRISING A NOISE REDUCTION BAFFLE AND PROCESS FOR MANUFACTURING IT

(75) Inventor: Se-Hyung Park, Gyeonggi-do (KR)

(73) Assignee: INERGY AUTOMOTIVE SYSTEMS RESEARCH (Societe Anonyme), Brussels (BE)

( * ) Notice: Subject to any disclaimer, the term of this patent is extended or adjusted under 35 U.S.C. 154(b) by 1119 days.

(21) Appl. No.: 13/059,247

(22) PCT Filed: Aug. 28, 2009

(86) PCT No.: PCT/EP2009/061117
§ 371 (c)(1),
(2), (4) Date: Feb. 16, 2011

(87) PCT Pub. No.: WO2010/023267
PCT Pub. Date: Mar. 4, 2010

(65) Prior Publication Data
US 2011/0139793 A1    Jun. 16, 2011

(30) Foreign Application Priority Data

Sep. 1, 2008   (EP) .................................... 08163396

(51) Int. Cl.
*B60F 3/00*    (2006.01)
*B62D 33/00*   (2006.01)
(Continued)

(52) U.S. Cl.
CPC ......... *B60K 15/03177* (2013.01); *B60K 15/077* (2013.01); *B60K 2015/0344* (2013.01); *B60K 2015/03467* (2013.01); *Y10T 29/4998* (2015.01)

(58) Field of Classification Search
CPC ........... B60K 15/03177; B60K 15/077; B60K 2015/0344; B60K 2015/03493; B60K 2015/077; B60K 2015/0775; B60K 2015/0777; B65D 11/22; B65D 90/52
USPC .................................. 220/563, 4.14; 137/574
See application file for complete search history.

(56) References Cited

U.S. PATENT DOCUMENTS 5,308,573 A  *  5/1994  Hirakawa ...................... 264/516
5,931,353 A     8/1999  Guyomard et al.
(Continued)

FOREIGN PATENT DOCUMENTS

CN   1894510 A    1/2007
DE   19525222 A1  1/1997
(Continued)

OTHER PUBLICATIONS

Combined Office Action and Search Report issued Mar. 27, 2014 in Chinese Patent Application No. 200980133053.8 (with English translation).
(Continued)

*Primary Examiner* — Fenn Mathew
*Assistant Examiner* — Andrew T Kirsch
(74) *Attorney, Agent, or Firm* — Oblon, McClelland, Maier & Neustadt, L.L.P.

(57) ABSTRACT

Plastic fuel tank comprising a noise reduction baffle and interference sections for suppressing tank deformation in the case of application of negative pressure to said tank, the interference sections projecting inward in the tank from an upper surface and a lower surface thereof respectively, and being disposed so as to be substantially opposed with a specified interval between them, one of these sections being part of a fixation device which secures the baffle to the tank wall.

11 Claims, 3 Drawing Sheets

(51) Int. Cl.
- *B65D 88/12* (2006.01)
- *B65D 6/00* (2006.01)
- *B65D 8/00* (2006.01)
- *E03B 11/00* (2006.01)
- *F17D 1/00* (2006.01)
- *B60K 15/03* (2006.01)
- *B60K 15/077* (2006.01)

(56) References Cited

U.S. PATENT DOCUMENTS

| | | | |
|---|---|---|---|
| 6,033,749 A | | 3/2000 | Hata et al. |
| 6,135,306 A | * | 10/2000 | Clayton et al. ................ 220/564 |
| 6,138,859 A | | 10/2000 | Aulph et al. |
| 6,338,420 B1 | * | 1/2002 | Pachciarz et al. ............. 220/562 |
| 6,408,979 B1 | * | 6/2002 | Forbes et al. ................. 181/198 |
| 6,499,620 B1 | | 12/2002 | Boguet et al. |
| 7,819,272 B2 | * | 10/2010 | Sugiura .......................... 220/563 |
| 2001/0015513 A1 | | 8/2001 | Schaftingen et al. |
| 2005/0016600 A1 | * | 1/2005 | Knaggs et al. ................ 137/590 |
| 2006/0207991 A1 | | 9/2006 | Sugiura |
| 2007/0209187 A1 | | 9/2007 | Buffard et al. |
| 2008/0061066 A1 | * | 3/2008 | Borchert et al. ............. 220/562 |

FOREIGN PATENT DOCUMENTS

| | | |
|---|---|---|
| EP | 0514555 A1 | 11/1992 |
| EP | 0 742 096 A2 | 11/1996 |
| EP | 0875411 A2 | 11/1998 |
| EP | 1110697 A2 | 6/2001 |
| EP | 1714820 A2 | 10/2006 |
| FR | 2775225 A1 | 8/1999 |
| JP | 61089824 A | 5/1986 |
| JP | 64-18919 U | 1/1989 |
| JP | 1-130941 U | 9/1989 |
| JP | 3-68122 U | 7/1991 |
| JP | 20000211382 A | 8/2000 |
| JP | 2003-170751 A | 6/2003 |
| JP | 20070237843 A | 9/2007 |
| KR | 10-0794003 | 1/2008 |

OTHER PUBLICATIONS

Office Action issued Sep. 22, 2014 in Japanese Patent Application No. 2013-217495 (with English language translation).

Office Action issued May 29, 2015 in Korean Patent Application No. 10-2011-7007439.

* cited by examiner

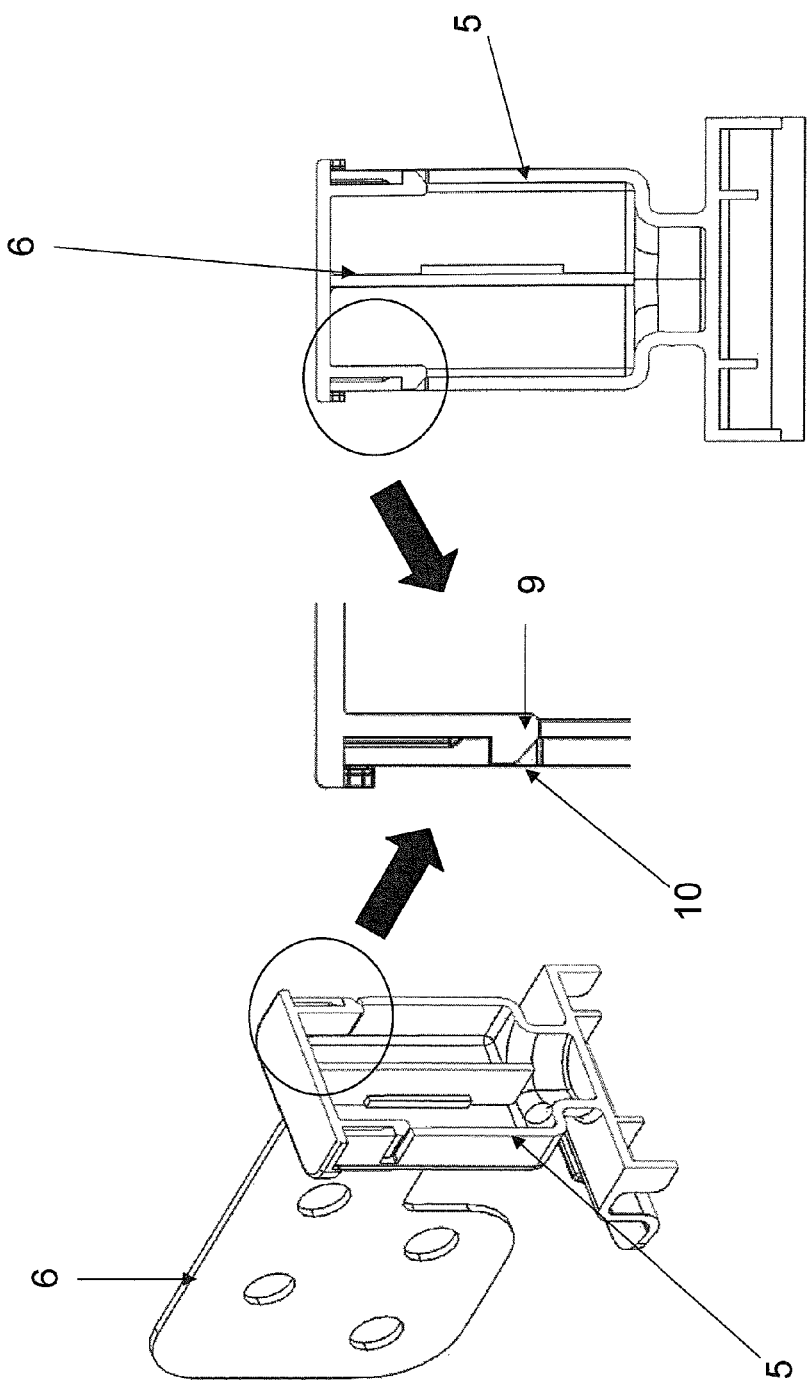

PLASTIC FUEL TANK COMPRISING A NOISE REDUCTION BAFFLE AND PROCESS FOR MANUFACTURING IT

CROSS-REFERENCE TO RELATED APPLICATIONS

This application is a U.S. national stage entry under 35 U.S.C. §371 of International Application No. PCT/EP2009/061117 filed Aug. 28, 2009, which claims priority to European Application No. 08163396.8 filed Sep. 1, 2008, this application being herein incorporated by reference in its entirety for all purposes.

TECHNICAL FIELD OF THE INVENTION

The present invention relates to (a process for manufacturing) a plastic fuel tank equipped with a noise reduction baffle.

BACKGROUND OF THE INVENTION

Fuel systems on board vehicles of various types generally comprise a tank for storing fuel, and this tank generally comprises at least one internal accessory. One particular case of such accessories is that of noise reduction baffles, the purpose of which is to absorb the noise ("slosh" noise) associated with the waves which may be generated inside the tank when the vehicle accelerates rapidly, brakes, turns, etc. Such baffles are also known as "anti-slosh baffles" in the automotive field.

In some countries, environmental legislations have forced the use of OBD systems (i.e., On Board Diagnosis systems) to test the leak tightness of the fuel systems of the vehicles. Often, these tests imply putting the tank for some time under negative pressure. Hence, especially in the case of plastic tanks, these have to be designed to withstand these negative pressures.

The process described in Application US 2006/0207991 makes it possible to solve this problem by providing interference sections projecting inward in the fuel tank from an upper surface and a lower surface of the fuel tank, respectively, and being disposed so as to be substantially opposed with a specified interval between them. In a specific embodiment, these sections are molded in the shape of baffles which also act as slosh noise suppressing baffles. However, such a solution offers several drawbacks:
- the volume occupied by said baffles is rather important and reduces the inner volume available for the fuel
- it increases the overall weight of the tank, each baffle being kind of double walled
- it does not offer many possibilities in terms of shape and material since these baffles are molded from the tank wall.

SUMMARY OF THE INVENTION

The present invention aims at solving these problems by providing a process which allows to provide a fuel tank both with a noise reduction baffle and with a vacuum (negative pressure) resistance device and this in an easy and flexible way, without limiting the internal volume of the tank or increasing its weight.

For this purpose, the present invention relates to a plastic fuel tank comprising a noise reduction baffle and interference sections for suppressing tank deformation in the case of application of negative pressure to said tank, the interference sections projecting inward in the tank from an upper surface and a lower surface thereof respectively, and being disposed so as to be substantially opposed with a specified interval between them, one of these sections being part of a fixation device which secures the baffle to the tank wall.

BRIEF DESCRIPTION OF THE DRAWINGS

For a detailed description of the invention, reference will now be made to the accompanying drawings in which:

FIG. 3 illustrates in detail how the cover molded in one piece with the baffle is fixed on the bar.

DESCRIPTION OF THE PREFERRED EMBODIMENTS

Figure 1:
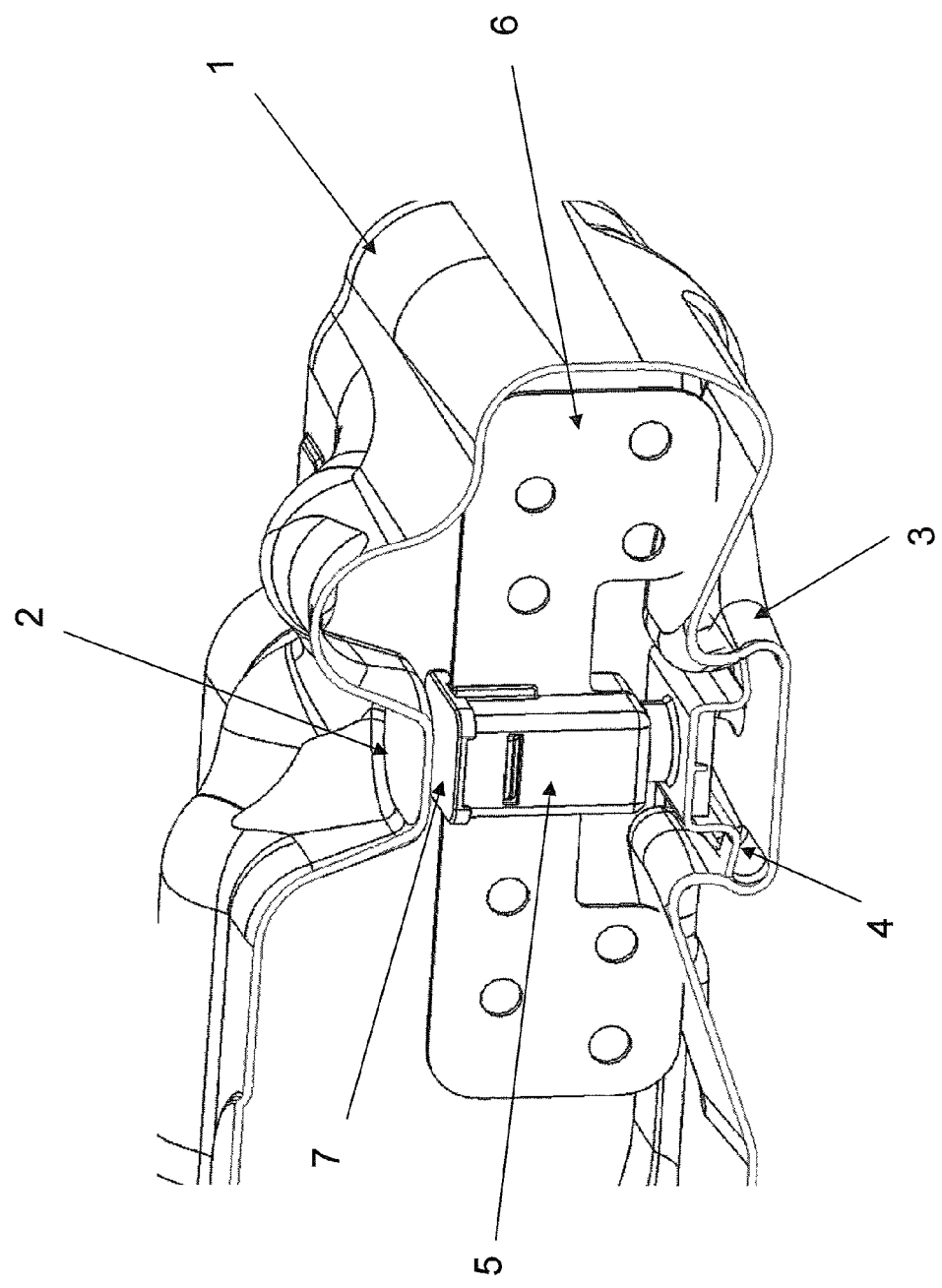
FIG. 1 illustrates a cut into a fuel tank in which a baffle has been fixed using a hollow bar.

The expression "fuel tank" is understood to mean a leak proof tank, able to store fuel under diverse and varied usage and environmental conditions. An example of this tank is that with which motor vehicles are fitted.

The fuel tank according to the invention is made with a plastic wall, generally comprising an internal face on its concave part and an external face on its convex part.

The term "plastic" is understood to mean any material comprising at least one synthetic polymer resin.

Any type of plastic may be suitable. Particularly suitable plastics belong to the category of thermoplastics.

The term "thermoplastic" is understood to mean any thermoplastic polymer, including thermoplastic elastomers, and also blends thereof. The term "polymer" is understood to mean both homopolymers and copolymers (especially binary or ternary copolymers). Examples of such copolymers are, in a non-limiting way: random copolymers, linear block copolymers, other block copolymers and graft copolymers.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersion in their molecular weight.

In particular, it is possible to use polyolefins, thermoplastic polyesters, polyketones, polyamides and copolymers thereof. A blend of polymers or copolymers may also be used similarly it is also possible to use a blend of polymeric materials with inorganic, organic and/or natural fillers such as, for example, but without being limiting: carbon, salts and other inorganic derivatives, natural or polymeric fibres. It is also possible to use multilayer structures composed of stacked and joined layers comprising at least one of the polymers or copolymers described above.

One polymer that is often used is polyethylene. Excellent results have been obtained with high-density polyethylene (HDPE).

Preferably, the tank for which the process according to the invention is intended has a multilayer structure comprising at least one thermoplastic layer and at least one additional layer which, advantageously, may be formed from a material that is a barrier to liquids and/or gases.

Preferably, the nature and the thickness of the barrier layer are chosen so as to minimize the permeability of the liquids and gases in contact with the wall of the tank. Preferably, this layer is based on a barrier material, i.e., a fuel-impermeable resin such as, for example, EVOH (a partially hydrolysed ethylene/vinyl acetate copolymer). Alternatively, the tank may be subjected to a surface treatment (fluorination or sulfonation) for the purpose of making it impermeable to the fuel.

Fuel tanks based on outer HDPE layers with an internal EVOH layer are preferred.

By "baffle" is meant a generally flat part, preferably a plate, which may have any shape and which has preferably holes in it in order to allow fuel to pass through it.

Preferably, the baffle is made of plastic and most particularly preferably, it is based on the same plastic as that forming the parison (and therefore the tank which is molded from it). It is therefore, advantageously, a baffle made of high-density polyethylene (HDPE), which is a material which is cheaper than POM, shows a good resistance against fuel and has a good durability (little ageing).

Alternatively, the baffle may be integrated with its fixation device (which will be detailed below), in which case it is preferably made from an elastic plastic like a polyacetal, and particularly POM (poly-oxy-methylene).

The terms "interference sections" are meant to designate two portions in relief in the tank which are of a shape and size such that they mate when negative pressure is applied on the tank so as to prevent it from collapsing. Generally, they each comprise a flat surface and both flat surfaces come into contact when negative pressure is applied. Preferably, both surfaces come into contact on at least 10 cm$^2$, preferably at least 15 cm$^2$ and even more preferable: on at least 20 cm$^2$. At rest, these surfaces have an interval (space) between them which is of a few mm (typically: from 10 to 20 mm).

According to the invention, one of these sections is part of a fixation device which secures the baffle to the tank wall. This fixation device may be integral with the baffle. However, especially in the case the tank comprises several baffles with different geometries (which is often the case because the tank section generally varies), it is preferable to manufacture (and preferably: to mold from plastic) the baffle and its fixation device separately so that said fixation device may be standard (identical for all baffles). In that case, the fixation device is preferably made from a material with good elasticity (like POM), while the baffle is preferably made from HDPE.

This fixation device may have any shape provided it has a surface which matches a corresponding surface of the other interference section. A square or cylindrical bar gives good results. In a preferred embodiment, it is a hollow part which comprises a slit (preferably vertical) into which the baffle may be inserted. In that embodiment, this hollow part has a cover plate which acts as one of the interference sections, and which may be molded as one piece with the baffle. Preferably, said cover and the hollow part (bar) comprise means matching each other so that the cover may be fixedly secured to the bar. A hook on the cover which matches with a slit (orifice) of appropriate shape and size on the bar, gives good results. Generally, this slit is horizontal.

The fixation device may be fixed to the tank wall by welding, rivet snapping or the like. However, one technique that gives good results is the one described in patent EP 875411 to the Applicant and which consists in molding a portion in relief in the tank wall and in providing means for cooperating therewith on the fixation device. These means preferably consist in elastic parts/extensions which may have any shape. Preferably, the portion in relief in the tank wall has the shape of a dove tail while the foot of the fixation device has the shape of a spider clip (i.e., has elastic extensions).

According to a preferred embodiment of the present invention, the other interference section (which is opposed to the one on the fixation device) is molded as one piece with the tank wall, preferably using a mold of adequate shape. It preferably has the shape of a dome with a flat surface. This surface is preferably bigger than the flat surface of the other interference section to get a more stable mating between 2 parts. This surface is preferably at least 10% bigger, even more at least 15% bigger and even more preferably: at least 20% bigger than the other one.

Preferably, this section is molded with the upper inner surface of the tank (i.e., with the "sealing" of the tank when in position in the vehicle), while the baffle is secured to the lower inner surface of the tank using the fixation device.

In order to solve the problem of attaching the baffle inside the tank without having to make an opening/cut therein, said baffle may be introduced into the tank at the same time as it is manufactured by extrusion of a tubular parison around such a baffle, and then by blow molding the parison and by attaching the baffle to this parison.

The term "parison" is understood to mean a preform of a single part, generally extruded and generally of substantially tubular shape, which is intended to form the wall of the tank after molding, i.e., after an operation which consists in forming the parison, which is in the melt state, into the required shapes and dimensions using the mold in order to obtain a tank. The tubular parison may eventually be cut in two halves which are then flattened so has to constitute sheets which are then molded using a mold comprising two outer cavities and one internal core. In that embodiment, the core may be used to fix the baffle (through its fixation part) for instance by welding or rivet snapping.

In the case of the embodiment described above according to which a portion in relief is molded in the tank wall and means for cooperating therewith are provided on the fixation device, the baffle and its fixation part are however fixed on the tank wall after said tank has been molded (because the portion in relief must be solid). The above mentioned dove tail/spider clip devices make it possible to easily fix them merely by sliding the clip inside the dove tail. In that embodiment, the baffle and its fixation device (which are preferably pre-assembled) are inserted in the tank through an orifice in its wall which preferably is already present on said tank, for instance: through the opening provided to insert the Fuel Delivery Module (FDM).

The present invention also relates to a process for making a plastic fuel tank comprising a noise reduction baffle and interference sections for suppressing tank deformation in the case of application of negative pressure to said tank, the interference sections projecting inward in the tank from an upper surface and a lower surface thereof respectively, and being disposed so as to be substantially opposed with a specified interval between them, said process comprising the following steps:

a parison is given the shape of the fuel tank using a mold with two cavities: one for the lower part of the tank and which includes a device which molds a dove tail in one piece with said part; and one for the upper part of the tank and which includes a device which molds the upper interference section as one piece with the tank wall the molded tank is allowed to cool down and solidify a fixation bar comprising a slit and a foot with a spider clip is provided the baffle is inserted into the slit of the bar and a cover, which may be in one piece with said baffle, is fixed on said bar in order to provide the lower interference section the baffle/fixation bar/cover assembly is inserted through an opening into the tank and the spider clip of the fixation bar is inserted into the dove tail.

In that process, the tank is advantageously molded by:
- blow-molding, i.e., by expanding the cut parison and pressing it against the mold cavities using a pressurized fluid (as described in Application EP 1110697, the content of which is for this purpose incorporated by reference in the present application);
- thermoforming the parison, i.e., by pressing the latter against the mold cavities, for example by providing suction (creating a vacuum) behind said cavities.

Preferably, the tank is molded by blow molding, optionally by drawing a vacuum behind the mold cavities (in order to press the parison thereon when the mold is open). This is because thermoforming generally involves heating the mold to a temperature close to the processing temperature of the plastic in order to be able to achieve deep deformations (corners of the tank for example, where the parison is highly stretched). This results in cycle times that are longer than with blow-molding, in which this constraint does not exist.

Figure 2:
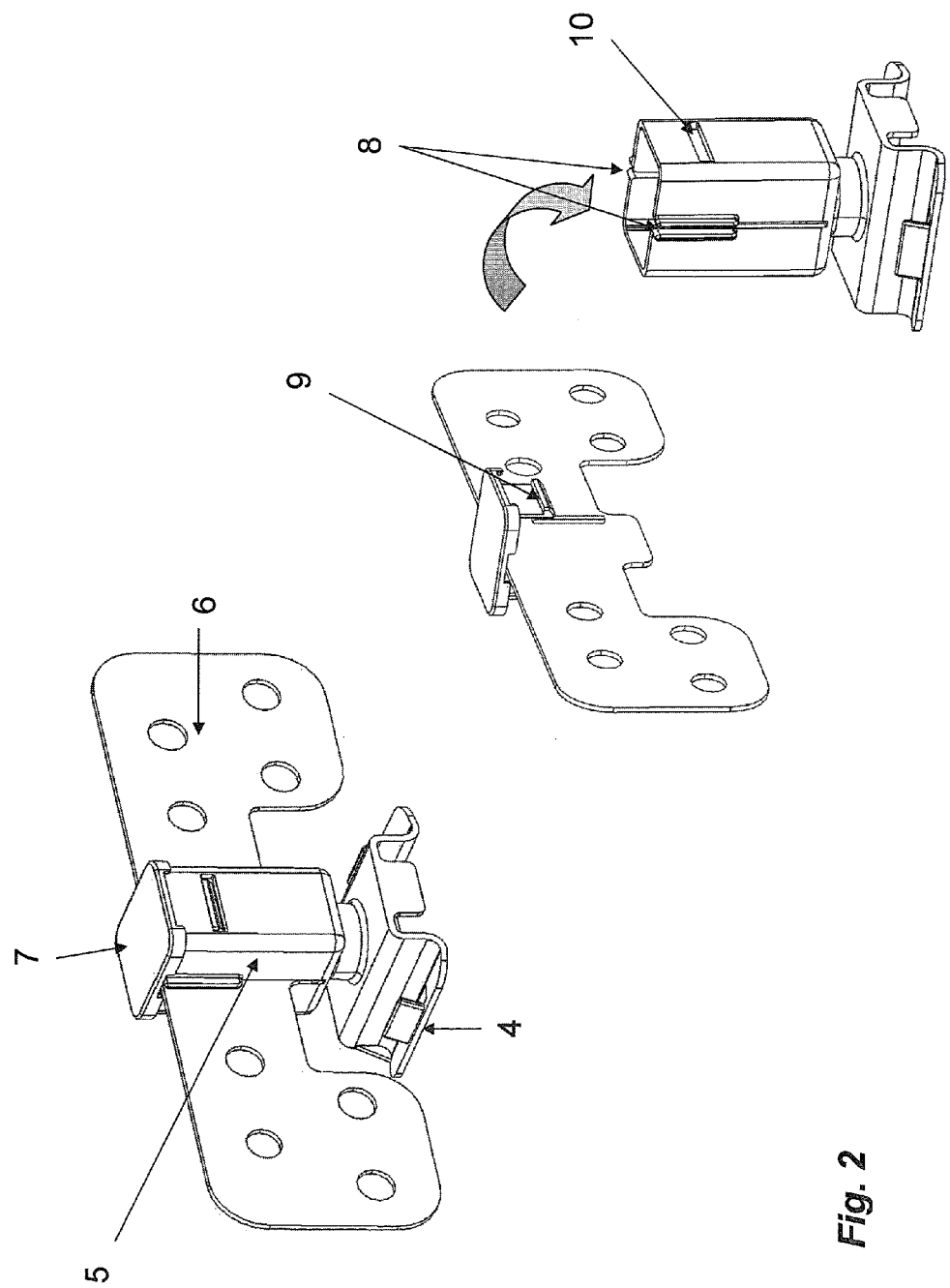
FIG. 2 illustrates how the baffle and the bar are assembled.

The objective of FIGS. 1 to 3 is to illustrate certain concrete aspects of the invention, without wishing to restrict the scope thereof in any way.

FIG. 1 shows a cut into a fuel tank in which a baffle has been fixed using a hollow bar. FIG. 2 shows how the baffle and the bar are assembled and FIG. 3 shows in detail how the cover molded in one piece with the baffle is fixed on the bar.

FIG. 1 shows a plastic fuel tank (1) which has been molded with a first interference section (2) and with a dove tail (3) opposed to it. In this dove tail, a spider clip (4) is inserted, which is molded with the foot of a hollow fixation bar (5) which secures a baffle (6) to the lower part of the tank (1). This baffle comprises a cover which shows a flat surface (7) acting as the second interference section. The parts are shown at rest (without negative pressure being applied to the tank) and hence, there is a small interval between both interference sections (2, 7).

FIG. 2 shows how the baffle (6) is inserted in a vertical slit (8) of the hollow fixation bar (5) and FIG. 3 shows in detail how the hook (9) borne by the cover fits into a second, horizontal slit (10) into the bar (5).

In the depicted embodiment:
- baffle (6) and cover (7) are made of HDPE and the fixation bar (5) is made of POM; and
- the upper interference surface (2) is about 27.6 cm² while the lower one (7) is about 22.3 cm².

The invention claimed is:

1. A plastic fuel tank comprising:
a noise reduction baffle and
interference sections for suppressing tank deformation in the case of application of negative pressure to said tank, the interference sections projecting inward in the tank from an upper surface and a lower surface thereof respectively, and being disposed so as to be substantially opposed with a specified interval between them, one of these interference sections being part of a fixation device which secures the baffle to a tank wall, wherein
in the case of application of a predetermined value of the negative pressure to the tank, said interference sections come into contact with each other, the interference sections not being in contact with each other otherwise, and
wherein the fixation device is a hollow part which comprises a vertical slit into which the baffle is inserted.

2. The plastic tank according to claim 1, wherein the baffle and its fixation device are parts manufactured separately and assembled.

3. The plastic tank according to claim 2, wherein the fixation device is made from poly-oxy-methylene, and wherein the baffle is made from high density polyethylene.

4. The plastic tank according to claim 1, wherein the hollow part has a cover plate which acts as one of the interference sections, said cover plate comprising a hook which matches with a horizontal slit on the hollow part.

5. The plastic tank according to claim 1, wherein the tank wall comprises a portion in relief, and wherein the fixation device comprises means for cooperating therewith.

6. The plastic tank according to claim 5, wherein the portion in relief has the shape of a dove tail, and wherein the fixation device comprises a foot having the shape of a spider clip.

7. The plastic tank according to claim 1, wherein the other interference section which is opposed to the one on the fixation device is molded as one piece with the tank wall.

8. The plastic tank according to claim 7, wherein the integral interference section is molded with the upper inner surface of the tank while the baffle is secured to the lower inner surface of the tank.

9. A process for making a plastic fuel tank comprising a noise reduction baffle and interference sections for suppressing tank deformation in the case of application of negative pressure to said tank, the interference sections projecting inward in the tank from an upper surface and a lower surface thereof respectively, and being disposed so as to be substantially opposed with a specified interval between them, said process comprising the following steps:
a parison is given the shape of the fuel tank using a mold with two cavities: one for the lower part of the tank and which includes a device which molds a dove tail in one piece with said lower part; and one for the upper part of the tank and which includes a device which molds the upper interference section as one piece with the tank wall;
the molded tank is allowed to cool down and solidify;
a fixation bar comprising a slit and a foot with a spider clip is provided;
the baffle is inserted into the slit of the bar and a cover is fixed on said bar in order to provide the lower interference section;
wherein the baffle/fixation bar/cover assembly is inserted through an opening into the tank, and wherein the spider clip of the fixation bar is inserted into the dove tail, such that in the case of application of a predetermined value of the negative pressure to the tank, said interference sections come into contact with each other, the interference sections not being in contact with each other otherwise.

10. A plastic fuel tank comprising:
a noise reduction baffle and
interference sections that suppress tank deformation in the case of application of negative pressure to said tank, the interference sections projecting inward in the tank from an upper surface and a lower surface thereof respectively, and being disposed so as to be substantially opposed with a specified interval between them, wherein
one of the interference sections is part of a fixation device which secures the baffle to the tank wall and is molded as one piece with the baffle, and
wherein the fixation device is a hollow part which comprises a vertical slit into which the baffle is inserted.

11. The plastic tank according to claim 4, wherein the cover plate is in one piece with the baffle.

* * * * *